United States Patent
Munro

(10) Patent No.: US 8,254,665 B2
(45) Date of Patent: Aug. 28, 2012

(54) SYSTEMS FOR CAPTURING THREE-DIMENSIONAL ONE OR MORE IMAGES AND METHODS THEREOF

(75) Inventor: James F. Munro, Walworth, NY (US)

(73) Assignee: Munro Design & Technologies, LLC, Webster, NY (US)

( * ) Notice: Subject to any disclaimer, the term of this patent is extended or adjusted under 35 U.S.C. 154(b) by 249 days.

(21) Appl. No.: 11/843,239

(22) Filed: Aug. 22, 2007

(65) Prior Publication Data

US 2008/0050013 A1    Feb. 28, 2008

Related U.S. Application Data

(60) Provisional application No. 60/839,382, filed on Aug. 22, 2006.

(51) Int. Cl.
*G06K 9/00*    (2006.01)
(52) U.S. Cl. ........ 382/154; 250/255; 250/318; 313/529; 313/537; 356/4.01; 356/4.03; 356/16; 348/135; 348/46; 348/371
(58) Field of Classification Search .................. 382/154; 356/4.01
See application file for complete search history.

(56) References Cited

U.S. PATENT DOCUMENTS

| | | | |
|---|---|---|---|
| 7,170,057 B2 * | 1/2007 | Filipovich et al. | 250/330 |
| 7,186,965 B2 * | 3/2007 | Schrey et al. | 250/214 VT |
| 7,202,941 B2 | 4/2007 | Munro | |
| 2004/0066965 A1 * | 4/2004 | Watanabe et al. | 382/154 |
| 2004/0135992 A1 * | 7/2004 | Munro | 356/4.01 |
| 2006/0132472 A1 * | 6/2006 | Peeters et al. | 345/204 |
| 2007/0091175 A1 * | 4/2007 | Iddan et al. | 348/135 |

OTHER PUBLICATIONS

"Imaging Cameras—PI-MAX," Princeton Instruments, [Retrieved from the internet http://www.piacton.com/products/imcam/pimax/defauit.aspx], 1-3 (2007).
"Imaging Cameras—PI MAX Datasheets" Princeton Instruments, [Retrieved from the internet http://www.piacton.com/products/imcam/pimax/dsheet.aspx], 1-2 (2007).
"Library—PI-MAX—ICCD" Princeton Instruments, [Retrieved from internet http://www.piacton.com/techlibrary/Category.aspx?cid=71] 1-2 (2007).
International Search Report for International Patent Application No. PCT/US07/76504 (Sep. 18, 2008).

* cited by examiner

*Primary Examiner* — John Lee
(74) *Attorney, Agent, or Firm* — LeClairRyan, a Professional Corporation

(57) ABSTRACT

Methods and systems for three-dimensional imaging include sampling one or more emissions which are reflected back from a target scene with one or more micro-channel plates. The one or more sampled emissions are processed in one or more frames. Within each frame a phase is extracted and a distance to the target scene and amplitude is determined on a pixel-by-pixel basis. A three dimensional image of the target scene is generated and provided based on the extracted phase and the determined distance and amplitude for the one or more frames.

40 Claims, 6 Drawing Sheets

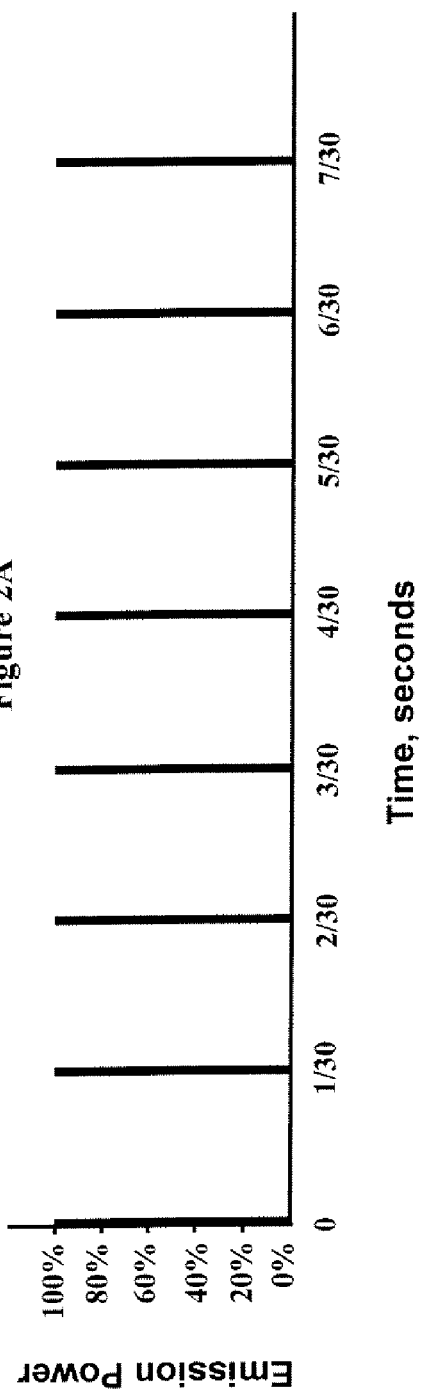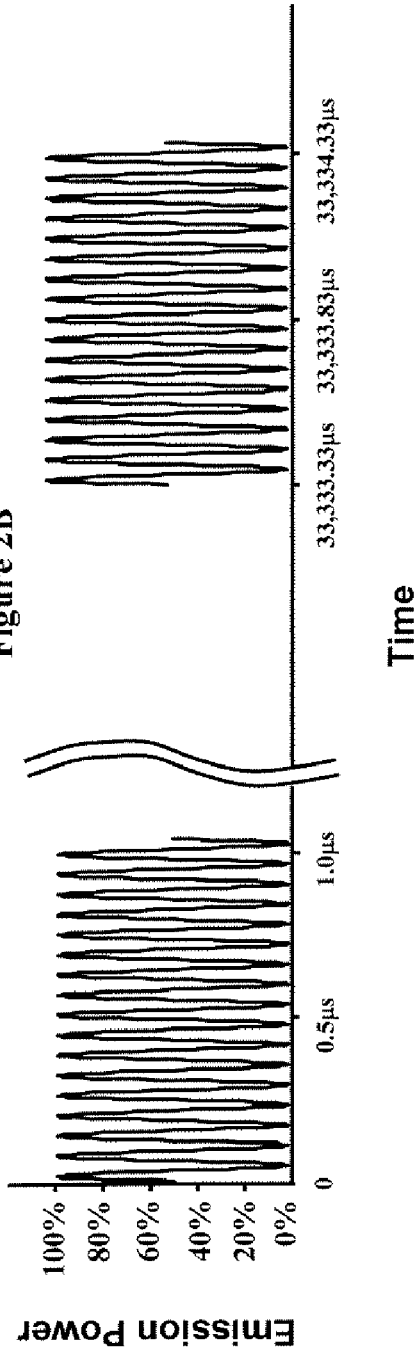

ical filter. The photocathode converts the imaged photons into
SYSTEMS FOR CAPTURING THREE-DIMENSIONAL ONE OR MORE IMAGES AND METHODS THEREOF This application claims the benefit of U.S. Provisional Patent Application Ser. No. 60/839,382, filed on Aug. 22, 2006, which is hereby incorporated by reference in its entirety.

FIELD OF THE INVENTION

The present invention generally relates to systems and methods for imaging and, more particularly, to systems and methods for three-dimensional imaging of a three-dimensional target scene.

BACKGROUND

In the most basic embodiment, three-dimensional imaging consists of capturing one additional spatial coordinate, i.e. object range or distance from the imaging system, as compared to conventional two-dimensional imaging. While two-dimensional electronic imaging has been in existence for over forty years, and radio ranging has been in existence for approximately eighty years, the ability to quickly, easily and effectively capture three-dimensional images, based on a marriage of any two-dimensional imaging and ranging technologies has as of yet been unsuccessful.

This disappointing lack of a successful three-dimensional image capturing technology is due in large part to the demands the operators place on such a device. That is the resulting three-dimensional imaging system, also known as a range camera, must be simple to use, be low-cost and mass-producible, provide color images, have good spatial resolution, be housed in a compact package, and be able to produce three-dimensional images in a relatively short period of time.

SUMMARY

A method for three-dimensional imaging in accordance with embodiments of the present invention includes sampling one or more emissions which are reflected back from a target scene with one or more micro-channel plates. The one or more sampled emissions are processed in one or more frames. Within each frame a phase is extracted and a distance to the target scene and amplitude is determined on a pixel-by-pixel basis. A three dimensional image of the target scene is generated and provided based on the extracted phase and the determined distance and amplitude for at least a portion of the pixels in the one or more frames.

A system for three-dimensional imaging in accordance with other embodiments of the present invention includes an imaging assembly and an image processing system. The imaging assembly samples one or more emissions which are reflected back from a target scene with one or more micro-channel plates. The image processing system processes the one or more sampled emissions from the imaging assembly in one or more frames. Within each frame the image processing system extracts a phase and determines a distance to the target scene and amplitude on a pixel-by-pixel basis. The image processing system generates and provides a three dimensional image of the target scene based on the extracted phase and the determined distance and amplitude for the at least a portion of the pixels in the one or more frames.

In accordance with other embodiments of the present invention, a coherent burst or otherwise sinusoidally modulated waveform, as from a laser, is emitted to illuminate a three-dimensional target scene that is to be three-dimensional imaged. A portion of the modulated waveform is reflected from the target scene and imaged by a collection and focusing lens system onto a photocathode through a narrow-pass optical filter. The photocathode converts the imaged photons into electrons which are directed through a micro-channel plate system coupled to a high voltage power supply. The micro-channel plate system samples and amplifies the relatively weak electronic signal by several orders of magnitude, and the resulting electron stream is directed onto a fluorescent screen. The fluorescent screen converts the electrons back into photons which are directed onto a conventional two-dimensional imaging array, such as a CCD or CMOS device. The CCD converts the photons back into electrons which are processed to generate the three dimensional image.

In addition to image intensification, another aspect of the micro-channel plate system is its ability to quickly capture a nearly instantaneous sample of the received optical signal. Since the received optical signal is of the same modulation waveform as the emitted optical signal, the micro-channel plate system can be used to capture samples of the received sinusoid emission. The phase and amplitude of the received sinusoidal emission varies with position across the face of the micro-channel plate in accordance with the distance and reflectance of the target scene. Once a sample is captured, it is intensified, stored on a fluorescent screen, transmitted to and ultimately is stored in the pixel cells of the two-dimensional imaging array. By way of example only, if four such samples are collected, each being 90° apart along the sinusoid, then Fourier transform methods can be used to compute the phase of the received modulated signal. A huge cost reduction is obtained if the samples are 90° apart in equivalent time, in which the sampling rate is less than that dictated by the Nyquist criterion. Knowing the phase of the received signal, on a pixel-by-pixel basis, combined with the a priori knowledge of the phase of the outgoing modulation emission, allows for measuring the distance to the target scene on a pixel-by-pixel basis by use of the formula distance=$c(\Delta\phi)/4\pi f$, where c is the speed of light, $\Delta\phi$ is the phase shift of the received signal compared to the transmitted signal, and f is the frequency of the burst modulation.

Accordingly, the present invention is able to capture three-dimensional images in color or monochromatic quickly, economically, and with high spatial resolution. Additionally, the present invention is simple to manufacture and easy to use and provides a three-dimensional imaging system that is compact in design.

BRIEF DESCRIPTION OF THE DRAWINGS

FIG. 2A is a graph of a macroscopic representation of a coherent burst waveform;

FIG. 2B is a graph of a close-up view of a coherent burst waveform;

DETAILED DESCRIPTION

Figure 1:
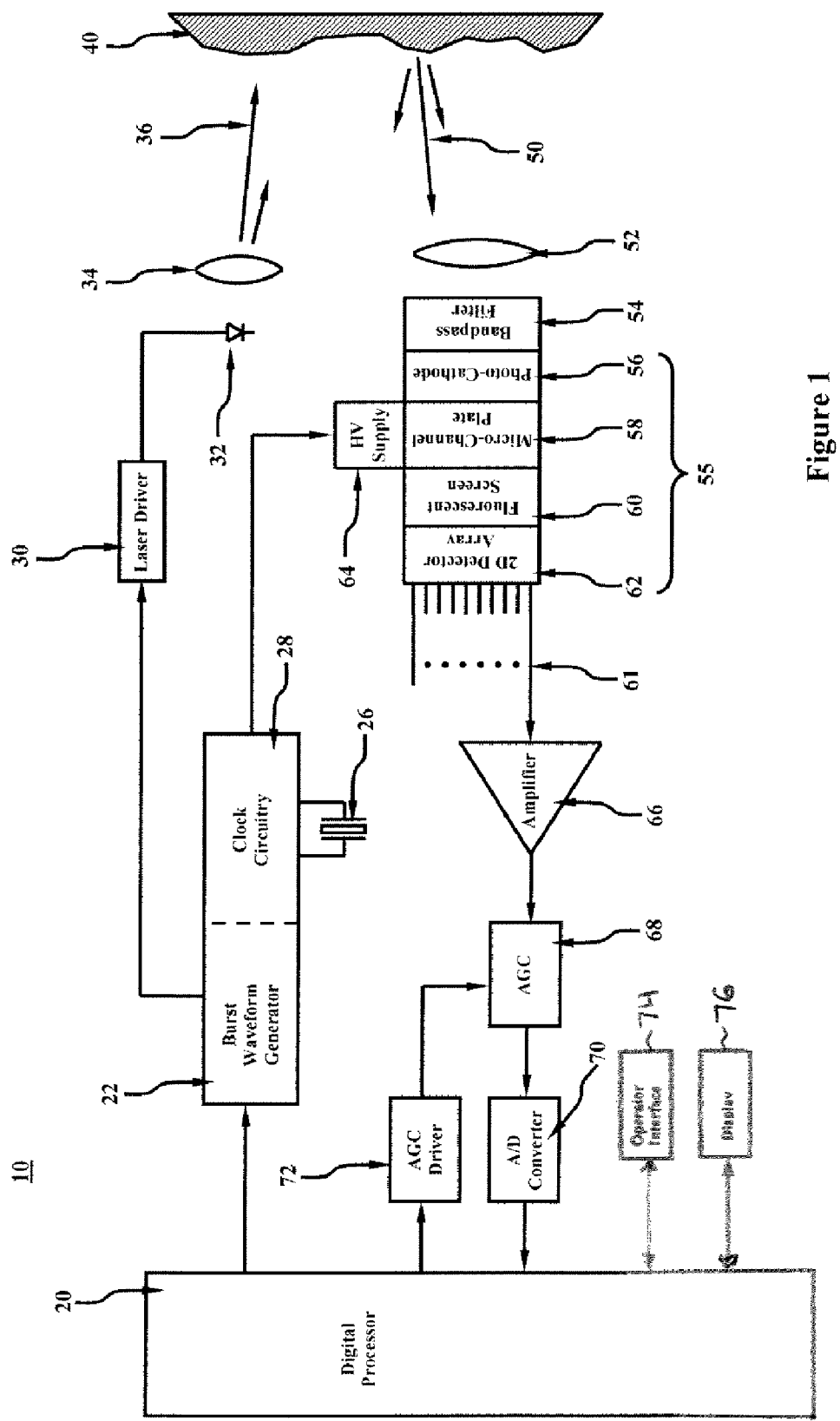
FIG. 1 is a block diagram of a monochromatic three-dimensional imaging system in accordance with embodiments of the present invention.

A three-dimensional imaging system 10 in accordance with embodiments of the present invention is illustrated in FIG. 1. The imaging system 10 includes a digital processing system or digital processor 20, a burst waveform generator 22, a crystal oscillator 26, clock circuitry 28, a laser driver 30, a laser diode 32, focusing systems 34 and 52, a bandpass filter 54, a photocathode device 56, a micro-channel plate device 58, a fluorescent screen 60, a two-dimensional detector array 62, a high voltage supply 64, an amplifier system 66, an automatic-gain-control (AGC) system 68, a analog-to-digital (A/D) converter 70, an AGC driver 72, an operator interface system 74, and a display system 76, although imaging system 10 can comprise other numbers and types of components in other configurations. The present invention provides a number of advantages including providing three-dimensional imaging methods and systems that are easy to use to capture three-dimensional images in color or monochromatic quickly, economically, and with high spatial resolution.

Three-dimensional imaging systems 10 and 100 in accordance with embodiments of the present invention described herein also are known as range cameras. These imaging systems 10 and 100 capture all of the image information of a conventional two-dimensional image, plus spatial information along one additional axis. Typically, this axis is along a radial direction away from the three-dimensional imaging system 10 and 100 and therefore is essentially a pixel-by-pixel distance measurement. The three-dimensional imaging systems 10 and 100 measure the distance to each image location in the target scene for each pixel comprising the captured image as described in greater below.

Referring more specifically to FIG. 1, the monochromatic three-dimensional imaging system 10 in accordance with embodiments of the present invention is illustrated. This imaging system 10 includes the digital processing system 20 which is coupled to the burst waveform generator 22, the A/D converter 70, the AGC driver 72, the operator interface system 74, and the display system 76, although the digital processing system 20 could be coupled to other numbers and types of components in other configurations. The digital processing system 20 controls the operation of the burst waveform generator 22 and the AGC driver 72, generates a three-dimensional image based on pixel data provided by the two-dimensional detector array 62 as explained in greater detail herein, and outputs the generated three-dimensional image to the display system 76 or another location, although the digital processing system 20 can perform other numbers and types of operations.

The digital processing system 20 includes a processing unit and a memory, although the digital processing system 20 can have other numbers and types of components in other configurations. The memory stores programmed instructions and data for capturing or otherwise generating a three-dimensional image as described and illustrated herein for execution by the processing unit, although some or all of these instructions and data may be stored elsewhere. A variety of different types of memory storage devices, such as a random access memory (RAM), a read only memory (ROM) or a floppy disk, hard disk, CD ROM, or other computer readable medium which is read from and/or written to by a magnetic, optical, or other reading and/or writing system coupled to the processing unit, can be used for the memory. By way of example only, the digital processing system 20 could be a conventional microprocessor with an external memory or it can be a microcontroller with all memory located onboard. In another example, the digital processing system 20 could be a digital signal processor (DSP) integrated circuit, which is a microcomputer that has been optimized for digital signal processing applications, including Fourier transforms. The DSP integrated circuit could be as simple as a sixteen bit integer device for low-cost applications or it can be a thirty-two bit or higher floating point device for higher performance when cost is not an issue.

The burst waveform generator 22 is coupled to the digital processing system 20, the clock circuitry 28, and the laser driver 30, although the burst waveform generator 22 could be coupled to other numbers and types of components in other configurations. The burst waveform generator 22 is controlled by the digital processing system 20 and receives a master clock signal from the clock circuitry 28, although the burst waveform generator 22 could be controlled in other manners and can receive other numbers and types of signals. The burst waveform generator 22 outputs a sinusoidal burst waveform that is on for a certain period of time and then is OFF for another period of time and therefore is a burst signal which is routed to the laser driver 30, although other numbers and types of signals could be output to other components.

The clock circuitry 28 is coupled to the burst waveform generator, the crystal oscillator 26, and the high voltage supply 64, although the clock circuitry 28 could be coupled to other numbers and types of components in other configurations. The clock circuitry 28 is implemented in a programmable logic device, although the clock circuitry could be implemented in other manners, such as in an application specific integrated circuit. The clock circuitry 28 generates the clock signal which is used by the burst waveform generator 22 to generate the burst waveform. The timing of this waveform is determined by the crystal oscillator 26. In this particular embodiment, the clock circuitry 28 generates a twenty MHz clock signal, although other types of clock signals could be generated and used.

The laser driver 30 is coupled to the burst waveform generator 22 and the laser diode 32, although the laser driver 30 could be coupled to other numbers and types of components in other configurations. The laser driver 30 reformats the burst waveform from the burst waveform generator 22 to a format suitable for driving the laser diode 32. The laser driver 30 transmits the burst waveform to the laser diode 32 so that it emits the burst waveform with good fidelity.

The laser diode 32 converts the burst waveform output by the laser driver 30 into an electromagnetic emission, such as an optical wavelength, whose amplitude is modulated according to the burst waveform input to the laser diode 32, although the burst waveform from the burst waveform generator 22 could be converted to a signal for transmission towards the target scene 40 in other manners. The electromagnetic emission 36 emitted by the laser diode 32 is modulated according to the waveform input to it from the laser driver 30. The laser diode 32 is pointed towards the target scene 40 by an operator so that light emitted from the laser diode 32 is directed onto a target scene 40. Although a laser diode 32 is shown, other numbers and types of transmitting devices to transmit one or more emissions towards a target scene 40 can be used. For example, several laser diodes could be used in a parallel configuration to improve the brightness of the target scene illumination. In another example, the laser diode 32 could be replaced with one or more light emitting diodes as the illumination source.

A lens in a focusing system 34 is used to direct the emitted electromagnetic emission 36 from the laser diode 32 towards the target scene 40, although other types of systems with other numbers and types of lens and/or other optical components can be used for directing the emitted light can be used or the focusing system could be left out. By way of example only, the lens in Focusing system 34 and also the lens in focusing system 52 discussed below, can be multi-element lenses, such as a doublet or triplet. The lens in the focusing system 34 is positioned at a focal position such that the electromagnetic emission 36 illuminates the entire target scene 40 that is to be three-dimensionally photographed or otherwise captured. A variety of different types of one or more lenses could be used for this focusing system, such as a low-cost, injection, compression, or compression-injection molded plastic lens, a gradient index (GRIN) lens, or a spherical, aspherical, or molded glass lens, although other types of optical devices made of other materials also could be used. The target scene 40 can comprise any combination of solid, liquid, gas, or mixture thereof that acts to reflect, either diffusively or specularly, the transmitted electromagnetic emission back to the image capture assembly 55 or other receiver system.

The focusing system 52 is a lens which is used to focus reflected electromagnetic emission 50 or other reflected signals back from the target scene 40 on to the image capture assembly 55, although other types of systems with other numbers and types of lens and/or other optical components could be used or the collection optics could be left out. The lens for the focusing system 52 is plastic lens made with an injection, compression, or compression-injection molding processes, although other types of lens made of other materials, such as glass, could be used. In an alternative embodiment, either of the focusing systems 34 and 52 could also be configured to act as the focusing system for both the electromagnetic emission 36 emitted from the laser diode 32 and for the reflected electromagnetic emission 50 received back from the target scene 40 by way of a beamsplitter by way of example only.

The bandpass filter 54 is positioned to receive at least a portion of the reflected electromagnetic emission 50 from the target scene 40 focused by focusing system 52, although other types and numbers of or no filter could be used. The bandpass filter 54 is coupled to the photocathode device 56 and is a narrow bandpass filter with a bandwidth less than a few tens of nanometers wide, although the bandpass filter 54 could be coupled to other numbers and types of components in other configurations and other types of filters with other ranges could be used. In particular, the center of the pass band in the bandpass filter 54 is chosen so the wavelength of the electromagnetic emission 36 emitted from the laser diode 32 lies within the passband while substantially blocking all other wavelengths, although the bandpass filter 54 can be configured in other manners.

The image capture assembly 55 is coupled to the high voltage supply 64 and the amplifier system 66, although the image capture assembly 55 could be coupled to other numbers and types of components in other configurations. The image capture assembly 55, also known as an image-intensified CCD camera, comprises the photocathode device 56, the micro-channel plate device 58, the fluorescent screen 60, and the two-dimensional detector array 62, although the image capture assembly 55 could comprises other numbers and types of components in other configurations. The image capture assembly 55 is positioned to capture at least a portion of the reflected electromagnetic emission 50 back from the target scene 40. Although an image capture assembly 55 is shown, other types of devices for capturing at least a portion of the reflected electromagnetic emission 50 can be used, such as a radiation detection element suitable for converting the reflected electromagnetic emission 50 into an electronic signal.

More specifically, in this embodiment the photocathode device 56 is coupled to the bandpass filter 54 and the micro-channel plate device 58, although the photocathode device 56 could be coupled to other numbers and types of components in other configurations. The photocathode device 56 converts the incident signal light 50 that passes through bandpass filter 54 into electrons.

The micro-channel plate device 58 is positioned between the photocathode device 56 and the fluorescent screen 60 and is coupled to the high voltage power supply 64, although the micro-channel plate device 58 could be positioned in other manners and coupled to other numbers and types of components in other configurations. The micro-channel plate device 58 samples, accelerates and intensifies electrons from the photocathode device 56 which are passing through the micro-channel plate device 58. The micro-channel plate device 58 requires the high voltage supply 64 in order to operate as explained in greater detail herein.

The fluorescent screen 60 is positioned between the micro-channel plate device 58 and the two-dimensional detector array 62, although the fluorescent screen 60 could be positioned in other manners and coupled to other numbers and types of components in other configurations. The fluorescent screen 60 comprises phosphor materials that glow in a brightness proportionate to the number of electrons incident upon the fluorescent screen 60 via fluorescence, although other numbers and types of electron to photon conversion systems could be used.

The two-dimensional detector array 62 is optically coupled to the fluorescent screen 60 and also is coupled to the amplifier system 66, although the two-dimensional detector array 62 could be positioned in other manners and coupled to other numbers and types of components in other configurations. The two-dimensional photo-detector array 62 comprises a multitude of photo-detectors and charge storage cells that convert the photons incident upon it into electrons and then store the electrons until they can be read out at a later time. As the two-dimensional detector array 62 is being read out, the output of the cells are multiplexed onto one or more output lines 61 to the amplifier system 66. The two-dimensional detector array 62 is a charge-coupled-device (CCD), although other numbers and types of detectors could be used, such as CMOS detection device, an array of avalanche photodiodes, or an array of photodiodes or PIN photodiodes.

The high voltage power supply 64 is coupled to the clock circuitry 28 and the micro-channel plate device 58 in the image capture assembly 55, although the high voltage power supply 64 could be coupled to other numbers and types of components in other configurations. The high voltage power supply 64 provides a voltage difference on the order of several hundred volts on the conductors of the micro-channel plate device 58 in order to accelerate the electrons through the holes, although high voltage power supply 64 could supply other amounts of power. Additionally, the high voltage power supply 64 is under the control of the clock circuitry 28 and supplies the voltage only for a small fraction of a cycle of the coherent burst waveform, although other arrangements can be used.

In addition to the high voltage power supply 64, one or more additional power supplies may be coupled to the components in the imaging system 10 that require power. For ease of illustration, these one or more power supplies are not shown. A variety of different types of power supply systems can be used, such as AC power from a standard outlet or batteries which are regulated by power supply control circuitry.

The amplifier system 66 is coupled to the image capture assembly 55 and the AGC system 68, although the amplifier system 66 could be coupled to other numbers and types of components in other configurations. The amplifier system 66 comprises one or more amplifiers that amplify the signal received from the image capture assembly 55, although the received signal can be processed in other manners.

The AGC system 68 is coupled to the amplifier system 66, the A/D converter 70, and the AGC driver 72, although the AGC system 68 could be coupled to other numbers and types of components in other configurations. The AGC system 68 is used to amplify or attenuate the electronic signals so it falls within the dynamic range of the A/D converter 70 for an A/D conversion and for discrete Fourier transform (DFT) processing by digital processing system 20.

The A/D converter 70 is coupled to the AGC system 68 and the digital processing system 20, although the amplifier system 66 could be coupled to other numbers and types of components in other configurations. The A/D converter 70 converts the analog signal from the AGC system 68 into a digital format suitable for processing by the digital processing system 20.

The AGC driver 72 is coupled between the digital processing system 20 and the AGC system 68, although the AGC driver 72 could be coupled to other numbers and types of components in other configurations. The AGC driver 72 comprises a digital potentiometer located in the feedback path of the amplifier system 68, although the AGC driver 72 can comprise other numbers and types of components in other configurations. The digital potentiometer in the AGC driver 72 receives digital information that in turn controls the amount of resistance between two terminals of the device. This digitally controlled resistance, when placed in the feedback path of the amplifier system 66 can control the gain of the amplifier system 66. The digital information received by the digital potentiometer in the AGC driver 72 is sent to it by the digital processing system 20. When the digital processing system 20 is processing the sampled data, it will have access to the raw data output by the A/D converter 70. If one or more of the data samples are too large (saturating), then the digital processing system 20 will command the AGC driver 72 to produce a lower amount of gain within the AGC system 68. Alternately, if the digital processing system 20 determines that the average value of the samples is less than 25% of the full-scale output of the A/D converter 70, for example, then the digital processing system 20 will command the AGC driver 72 to produce a larger amount of gain within the AGC system 68.

The operator interface system 74 is coupled to the digital processing system 20 and enables an operator to enter requests and information or data into the digital processing system 20, such as to request a monochromatic or color, three-dimensional image capture or to adjust parameters related to capturing or otherwise generating a three-dimensional image. The operator interface system 74 can comprise something as simple as an on-off switch, or be more complex, such as a keypad or computer mouse for entering in commands or data to be encoded and transmitted by the digital processing system 20 or even a connection to a remote computer.

The display system 76 is coupled to the digital processing system 20 and enables an operator to view the captured or otherwise generated monochromatic or color, three-dimensional image, although other types and formats of data and information can be displayed. A variety of different types of devices can be used for display system 76.

Figure 6:
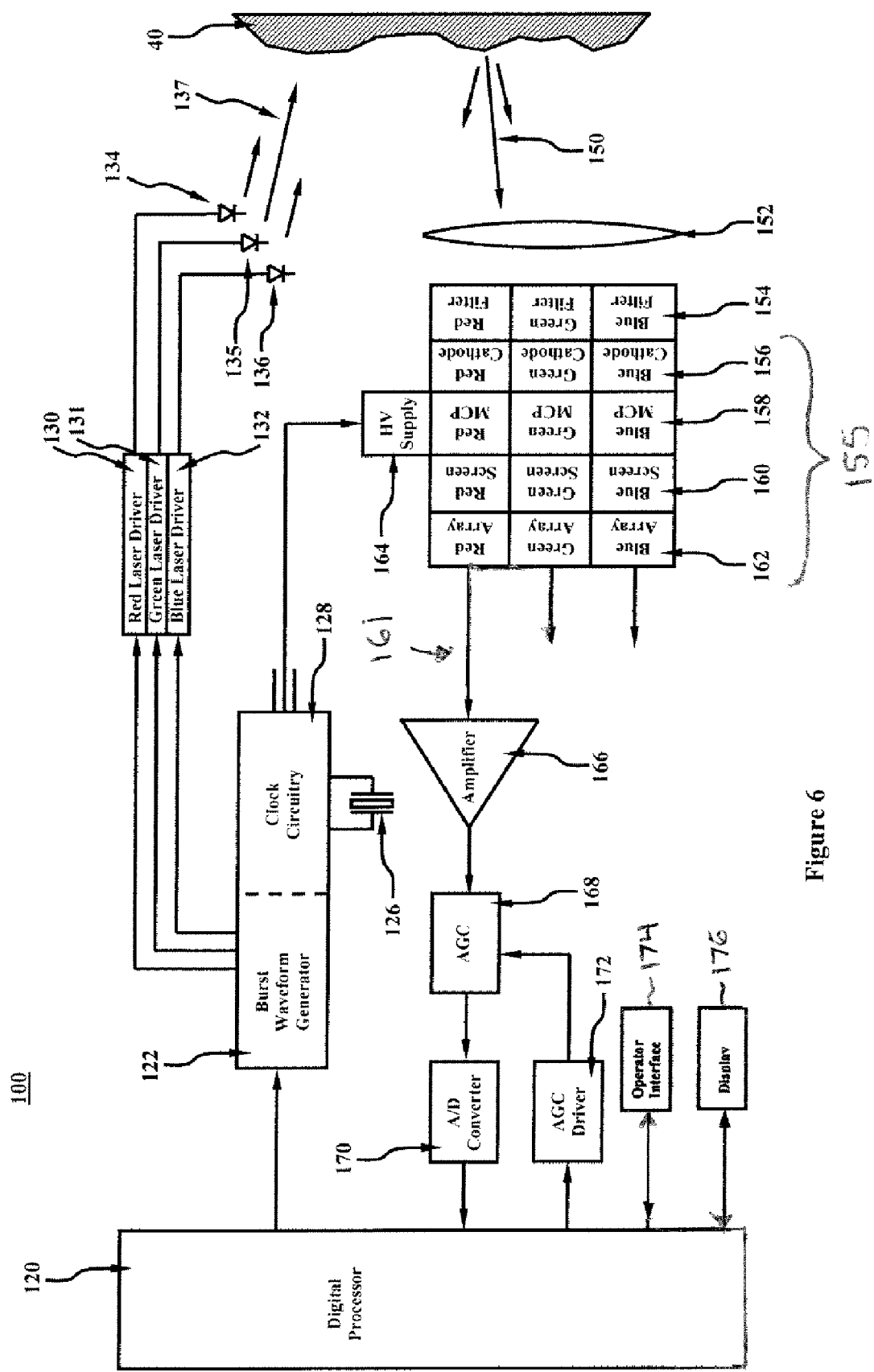
FIG. 6 is a block diagram of a color three-dimensional imaging system in accordance with other embodiments of the present invention.

Referring to FIG. 6, a color, three-dimensional imaging system 1000 in accordance with other embodiments of the present invention is illustrated. The imaging system 100 includes a digital processing system or digital processor 120, a burst waveform generator 122, a crystal oscillator 126, clock circuitry 128, red, green, and blue laser drivers 130, 131, and 132, laser diodes 134, 135, and 136, focusing system 152, red, green, and blue bandpass filters 154, red, green, and blue photocathode devices 156, red, green, and blue microchannel plate devices 158, red, green, and blue fluorescent screens 160, red, green, and blue two-dimensional detector arrays 162, high voltage supplies 164, amplifier systems 166, AGC systems 168, A/D converters 170, AGC drivers 172, an operator interface system 174, and a display system 176, although imaging system 100 can comprise other numbers and types of components in other configurations.

This imaging system 100 includes the digital processing system 120 which is coupled to the burst waveform generator 122, the A/D converter 170, the AGC driver 172, the operator interface system 174, and the display system 176, although the digital processing system 120 could be coupled to other numbers and types of components in other configurations. The digital processing system 120 controls the operation of the burst waveform generator 122 and the AGC driver 172, generates a three-dimensional image based on pixel data provided by the two-dimensional detector arrays 162 as explained in greater detail herein, and outputs the generated color, three-dimensional image to the display system 176 or another location, although the digital processing system 120 can perform other numbers and types of operations.

The digital processing system 120 includes a processing unit and a memory, although the digital processing system 120 can have other numbers and types of components in other configurations. The memory stores programmed instructions and data for capturing or otherwise generating a three-dimensional image as described and illustrated herein for execution by the processing unit, although some or all of these instructions and data may be stored elsewhere. A variety of different types of memory storage devices, such as a random access memory (RAM), a read only memory (ROM) or a floppy disk, hard disk, CD ROM, or other computer readable medium which is read from and/or written to by a magnetic, optical, or other reading and/or writing system coupled to the processing unit, can be used for the memory. By way of example only, the digital processing system 120 could be a conventional microprocessor with an external memory or it can be a microcontroller with all memory located onboard. In another example, the digital processing system 120 could be a digital signal processor (DSP) integrated circuit, which is a microcomputer that has been optimized for digital signal processing applications, including Fourier transforms. The DSP integrated circuit could be as simple as a sixteen bit integer device for low-cost applications or it can be a thirty-two bit or higher floating point device for higher performance when cost is not an issue.

The burst waveform generator 122 is coupled to the digital processing system 120, the clock circuitry 128, and the red, green, and blue laser drivers 130, 131, and 132, although the burst waveform generator 122 could be coupled to other numbers and types of components in other configurations. The burst waveform generator 122 is controlled by the digital processing system 120 and receives a master clock signal from the clock circuitry 128, although the burst waveform generator 122 could be controlled in other manners and can receive other numbers and types of signals. The burst waveform generator 122 outputs three sinusoidal burst waveforms that are each on for a certain period of time and then are OFF for another period of time and therefore are burst signals which are routed to the red, green, and blue laser drivers 130, 131, and 132, although other numbers and types of signals could be output to other components.

The clock circuitry 128 is coupled to the burst waveform generator, the crystal oscillator 126, and the high voltage supply 64, although the clock circuitry 128 could be coupled to other numbers and types of components in other configurations. The clock circuitry 128 generates the clock signal which is used by the burst waveform generator 22 to generate the burst waveforms. The timing of this waveform is determined by the crystal oscillator 126. In this particular embodiment, the clock circuitry 128 generates twenty MHz clock signals, although other types of clock signals could be generated and used.

The red, green, and blue laser drivers 130, 131, and 132 are coupled to the burst waveform generator 122 and the laser diodes 134, 135, and 136, although the red, green, and blue laser drivers 130, 131, and 132 could be coupled to other numbers and types of components in other configurations. The red, green, and blue laser drivers 130, 131, and 132 each reformat one of the burst waveforms from the burst waveform generator 122 to a format suitable for driving the laser diodes 134, 135, and 136. The red, green, and blue laser drivers 130, 131, and 132 transmit the burst waveforms to each of the laser diodes 134, 135, and 136 so they emit the burst waveforms with good fidelity.

The laser diodes 134, 135, and 136 converts each of the burst waveforms output by the red, green, and blue laser drivers 130, 131, and 132 into an electromagnetic emission, such as an optical wavelength, each of whose amplitude is modulated according to the burst waveform input to the laser diodes 134, 135, and 136, although the burst waveforms from the burst waveform generator 122 could be converted to a signal for transmission towards the target scene 40 in other manners. The electromagnetic emission 137 emitted by the laser diodes 134, 135, and 136 is modulated according to the waveform input to the from the red, green, and blue laser drivers 130, 131, and 132. The laser diodes 134, 135, and 136 are pointed towards the target scene 40 by an operator so that light emitted from the laser diodes 134, 135, and 136 is directed onto a target scene 40. In this embodiment, one of the laser diodes 134, 135, and 136 is in use at any one time, although other arrangements can be used, such as having a concurrent transmissions from two or more of the laser diodes 134, 135, and 136. Although laser diodes 134, 135, and 136 are shown, other numbers and types of transmitting devices to transmit one or more emissions towards a target scene 40 can be used. For example, additional laser diodes could be used to improve the brightness of the target scene illumination. In another example, the red, green, and blue laser diodes 134, 135, and 136 could be replaced with red, green, and blue light emitting diodes or other colored light sources as the illumination sources.

Although not shown, each of the red, green, and blue laser diodes 134, 135, and 136 could have a focusing system used to direct the emitted electromagnetic emission 137 from each of the red, green, and blue laser diodes 134, 135, and 136 towards the target scene 40, although other types of systems for directing the emitted light can be used or the focusing systems could be left out. The lens in these focusing systems are positioned at a focal position such that the electromagnetic emission 137 illuminates the entire target scene 40 that is to be three-dimensionally imaged or otherwise captured. A variety of different types of one or more lenses could be used for these focusing systems, such as a low-cost, injection, compression, or compression-injection molded plastic lens, a gradient index (GRIN) lens, or a spherical, aspherical, or molded glass lens, although other types of optical devices made of other materials also could be used. The target scene 40 can comprise any combination of solid, liquid, gas, or mixture thereof that acts to reflect, either diffusively or specularly, the transmitted electromagnetic emission back to the image capture assembly 55 or other receiver system.

The focusing system 152 is a lens which is used to focus reflected electromagnetic emission 150 or other reflected signals back from the target scene 40 on to the image capture assembly 155, although other types of collection optics or systems could be used or the collection optics could be left out. The lens for the focusing system 152 is plastic lens made with an injection, compression, or compression-injection molding processes, although other types of lens made of other materials, such as glass, could be used. In an alternative embodiment, either the focusing system 152 could also be configured to act as the focusing system for both the electromagnetic emission 137 emitted from the laser diodes 134, 135, and 136 and for the reflected electromagnetic emission 150 received back from the target scene 40 by way of a beamsplitter by way of example only.

The red, green, and blue bandpass filters 154 are positioned to receive at least a portion of the reflected electromagnetic emission 150 from the target scene 40 focused by focusing systems 152, although other types and numbers of or no filters could be used. The red, green, and blue bandpass filters 154 are coupled to the red, green, and blue photocathode devices 156, respectively, and are narrow bandpass filters with a bandwidth less than a few tens of nanometers wide, although the red, green, and blue bandpass filters 154 could be coupled to other numbers and types of components in other configurations and other types of filters with other ranges could be used. In this embodiment, the center of the pass band in each of the red, green, and blue bandpass filters 154 are chosen so the wavelength of the electromagnetic emission 137 emitted from the laser diodes 134, 135, and 136 lies within the passband while substantially blocking all other wavelengths, although the red, green, and blue bandpass filters 154 can be configured in other manners.

The image capture assembly 155 is coupled to the high voltage supply 64 and the amplifier system 166, although the image capture assembly 155 could be coupled to other numbers and types of components in other configurations. The image capture assembly 155 comprises the red, green, and blue photocathode devices 156, the red, green, and blue micro-channel plate devices 158, the red, green, and blue fluorescent screens 160, and the red, green, and blue two-dimensional detector arrays 162, although the image capture assembly 155 could comprises other numbers and types of components in other configurations. The image capture assembly 155 is positioned to capture at least a portion of the reflected electromagnetic emission 150 back from the target scene 40. Although an image capture assembly 155 is shown, other types of devices for capturing at least a portion of the reflected electromagnetic emission 150 can be used, such as a radiation detection element suitable for converting the reflected electromagnetic emission 150 into an electronic signal.

More specifically, in this embodiment the red, green, and blue photocathode devices 156 are coupled to the red, green, and blue bandpass filters 154 and the red, green, and blue micro-channel plate devices 158, although the red, green, and blue photocathode devices 156 could be coupled to other numbers and types of components in other configurations. The red, green, and blue photocathode device 156 each convert the incident signal light 150 that passes through red, green, and blue bandpass filters 154 into electrons.

The red, green, and blue micro-channel plate devices 158 are positioned between the red, green, and blue photocathode devices 156 and the red, green, and blue fluorescent screens 160 and are each coupled to one of the three high voltage power supplies represented by element number 164, although the red, green, and blue micro-channel plate devices 158 could be positioned in other manners and coupled to other numbers and types of power sources in other configurations. The red, green, and blue micro-channel plate devices 158 each sample, accelerate and intensify electrons from the red, green, and blue photocathode devices 156 which are passing through the red, green, and blue micro-channel plate devices 158. The red, green, and blue micro-channel plate devices 158 requires their high voltage supplies 164 in order to operate as explained herein.

The red, green, and blue fluorescent screens 160 are positioned between the red, green, and blue micro-channel plate devices 158 and the red, green, and blue two-dimensional detector arrays 162, although the red, green, and blue fluorescent screens 160 could be positioned in other manners and coupled to other numbers and types of components in other configurations. The red, green, and blue fluorescent screens 160 each comprise phosphor materials that glow in a brightness proportionate to the number of electrons incident upon the red, green, and blue fluorescent screens 160 via fluorescence, although other numbers and types of electron to photon conversion systems could be used.

The red, green, and blue two-dimensional detector arrays 162 are optically coupled to the red, green, and blue fluorescent screens 160 and also are coupled to the amplifier system 166, although the red, green, and blue two-dimensional detector arrays 162 could be positioned in other manners and coupled to other numbers and types of components in other configurations. The red, green, and blue two-dimensional photo-detector arrays 162 each comprise a multitude of photo-detectors and charge storage cells that convert the photons incident upon it into electrons and then store the electrons until they can be read out at a later time. As the red, green, and blue two-dimensional detector arrays 162 are each being read out, the output of the cells are multiplexed onto one or more output lines 161 to the amplifier systems 166. Each of the red, green, and blue two-dimensional detector arrays 162 are charge-coupled-device (CCD), although other numbers and types of detectors could be used, such as CMOS detection device, an array of avalanche photodiodes, or an array of photodiodes or PIN photodiodes.

The three high voltage power supplies 164 are each coupled to the clock circuitry 128 and to one of the red, green, and blue micro-channel plate devices 158 in the image capture assembly 155, although the high voltage power supplies 164 each could be coupled to other numbers and types of components in other configurations and other numbers and types of supplies could be used. The high voltage power supplies 164 each provide a voltage difference on the order of several hundred volts on the conductors of each of the red, green, and blue micro-channel plate devices 158 in order to accelerate the electrons through the holes, although high voltage power supplies 164 each could supply other amounts of power. Additionally, each of the high voltage power supplies 164 is under the control of the clock circuitry 128 and supplies the voltage only for a small fraction of a cycle of each of the coherent burst waveform, although other arrangements can be used.

In addition to the high voltage power supplies 164, one or more additional power supplies may be coupled to the components in the imaging system 100 that require power. For ease of illustration, these one or more power supplies are not shown. A variety of different types of power supply systems can be used, such as AC power from a standard outlet or batteries which are regulated by power supply control circuitry.

The output of each of the red, green, and blue two-dimensional imaging arrays 162 are coupled to one set of signal processing components comprising the amplifier system 166, the AGC system 168, the A/D converter 170, and the AGC driver 172, although the set can comprise other numbers and types of components in other configurations. Since the components and their connections and operation for each of these sets are the same, only one set from the red two-dimensional imaging array 162 is illustrated and described herein. The set (not shown) coupled between the digital processing system 20 and the green two-dimensional imaging array 162 and the set (not shown) coupled between the digital processing system 20 and the blue two-dimensional imaging array 162 are identical in structure and operation and thus will not be illustrated and described here.

The amplifier system 166 is coupled to the image capture assembly 155 and the AGC system 168, although the amplifier system 166 could be coupled to other numbers and types of components in other configurations. The amplifier system 166 comprises one or more amplifiers that amplify the signals received from the image capture assembly 155, although the received signals can be processed in other manners.

The AGC system 168 is coupled to the amplifier system 166, the A/D converter 170, and the AGC driver 172, although the AGC system 168 could be coupled to other numbers and types of components in other configurations. The AGC system 168 is used to amplify or attenuate the electronic signals so they fall within the dynamic range of the A/D converter 170 for an A/D conversion and for discrete Fourier transform (DFT) processing by digital processing system 120.

The A/D converter 170 is coupled to the AGC system 168 and the digital processing system 120, although the amplifier system 166 could be coupled to other numbers and types of components in other configurations. The A/D converter 170 converts the analog signal from the AGC system 168 into a digital format suitable for processing by the digital processing system 120.

The AGC driver 172 is coupled between the digital processing system 120 and the AGC system 168, although the AGC driver 172 could be coupled to other numbers and types of components in other configurations. The AGC driver 172 comprises a digital potentiometer located in the feedback path of the amplifier system 68, although the AGC driver 172 can comprise other numbers and types of components in other configurations. The digital potentiometer in the AGC driver 172 receives digital information that in turn controls the amount of resistance between two terminals of the device. This digitally controlled resistance, when placed in the feedback path of the amplifier system 166 can control the gain of the amplifier system 166. The digital information received by the digital potentiometer in the AGC driver 172 is sent to it by the digital processing system 120. When the digital processing system 120 is processing the sampled data, it will have access to the raw data output by the A/D converter 170. If one or more of the data samples are too large (saturating), then the digital processing system 120 will command the AGC driver 172 to produce a lower amount of gain within the AGC system 168. Alternately, if the digital processing system 120 determines that the average value of the samples is less than 25% of the full-scale output of the A/D converter 170, for example, then the digital processing system 120 will command the AGC driver 172 to produce a larger amount of gain within the AGC system 168.

The operator interface system 174 is coupled to the digital processing system 120 and enables an operator to enter requests and information or data into the digital processing system 120, such as to request a monochromatic or color, three-dimensional image capture or to adjust parameters related to capturing or otherwise generating a three-dimensional image. The operator interface system 174 can comprise something as simple as an on-off switch, or be more complex, such as a keypad or computer mouse for entering in commands or data to be encoded and transmitted by the digital processing system 120 or even a connection to a remote computer.

The display system 176 is coupled to the digital processing system 120 and enables an operator to view the captured or otherwise generated monochromatic or color three-dimensional image, although other types and formats of data and information can be displayed. A variety of different types of devices can be used for display system 176.

The operation of the imaging system 10 in accordance with embodiments of the present invention will now be described with reference to FIGS. 1-5. The digital processing system 20 issues a command to the burst waveform generator 22 to begin generation of the burst waveform. The burst waveform generator 22 takes as input a binary logic signal created by the clock circuitry 28, whose frequency of the signal is the same as the burst modulation frequency, typically 50 MHz, but as low as 1 MHz, or as high as 1 GHz. The burst waveform generator 22 gates the binary signal to create the burst envelope and then processes the binary signal, generally through a low-pass filtering function, to form a truncated sinusoid from the truncated binary signal.

A macro-view of the coherent burst emission waveform which is generated is shown in FIG. 2A. As illustrated, the emitted power is high for a short period of time, and then is OFF for a much longer period of time. While the emission is shown to be high, it is actually sinusoidally modulated, as shown in FIG. 2B. In a minimal configuration, the bursts are timed to occur with the fastest frame rate of the two-dimensional, detector array 62 of FIG. 1, which is typically $\frac{1}{30}^{th}$ of a second. A burst can comprise from two to several thousand cycles of modulation and the modulation frequency itself can be from less than 1 MHz to more than 1 GHz, although a value in the range from 10 MHz to 50 MHz is preferred. Alternately, it may be desirable to forego the OFF portion of the waveform, in which case the waveform is substantially sinusoidal whose duration is substantially the same as that of the entire three-dimensional image capturing time.

The truncated sinusoidal burst waveform is output from the burst waveform generator 22 and passed to the laser driver 30. Typically, the laser diode 32 has stringent voltage and current input requirement in order for proper operation. As a result, the laser driver 30 receives the truncated sinusoidal burst signal from the burst waveform generator 22 and scales the voltage to that needed by the laser diode 32, so the laser diode 32 operates efficiently and emits the sinusoidal portion of the coherent burst emission with good fidelity. In addition to providing the proper output voltage, the laser driver 30 also ensures that the laser diode 32 is supplied with an adequate supply of electrical power. The emission source, such as the laser diode 32, can emit in the infra-red, visible, ultraviolet optical wavelengths, although longer wavelength emissions can also be used, such as Terahertz-waves, millimeter waves, and radio frequencies.

The laser diode 32 converts the electrical electromagnetic emission supplied to it by the laser driver 30 into an electromagnetic emission 36. The electromagnetic emission 36, like all electromagnetic emissions, propagates at the speed of light from the laser diode 32 through the lens in focusing system 34 to the target scene 40. The waveform of the electromagnetic emission 36 should be a reasonably high-fidelity copy of the waveform input to the laser diode driver 30.

The purpose of the lens in focusing system 34 placed in front of the laser diode 32 is to ensure that the electromagnetic emission 36 is spatially broad enough to fill the entire target scene 40 to be three-dimensional imaged or otherwise captured. Normally, the emission from a bare unlensed laser diode 32 is very broad and, in general, will overfill the target scene 40. The emission from the laser diode 34 that lies outside the target scene 40 will not contribute to the three-dimensional imaging and will be wasted. On the other hand, the lens in focusing system 34 should not produce a collimated electromagnetic emission, as the target scene 40 will then be underfilled. The focal length of the lens in focusing system 34, and its placement in front of the laser diode 32 should be such that the target scene 40 is critically filled, with minimal lost light at the boundary of the target scene, and yet having the entire target scene 40 illuminated.

The electromagnetic emission 36 and/or the target scene 40 are usually in air, although they can be in another medium such as water, or even the vacuum of space. The present invention will work with any medium, provided that it is substantially homogeneous in nature.

The lens in focusing system 34 has a variable focal length, although other configurations can be used, such as having a fixed focal length. The variable focal length lens in focusing system 34 allows the illumination emitted by the laser diode 32 to be adjusted based on the angular width of the target scene 40. For a wide target scene, the lens in focusing system 34 would be adjusted for a wide area illumination and for a small or narrow target scene the lens in focusing system 34 would be adjusted for a narrow illumination pattern. Furthermore, the zoom adjustment of the lens in focusing system 34 could also act cooperatively with the zoom adjustment of the collection lens in focusing system 52, described below, so that the target scene illumination width is matched to the viewing area of the collection lens in focusing system 52, even with varying sizes of the target scene 40.

Figure 3:
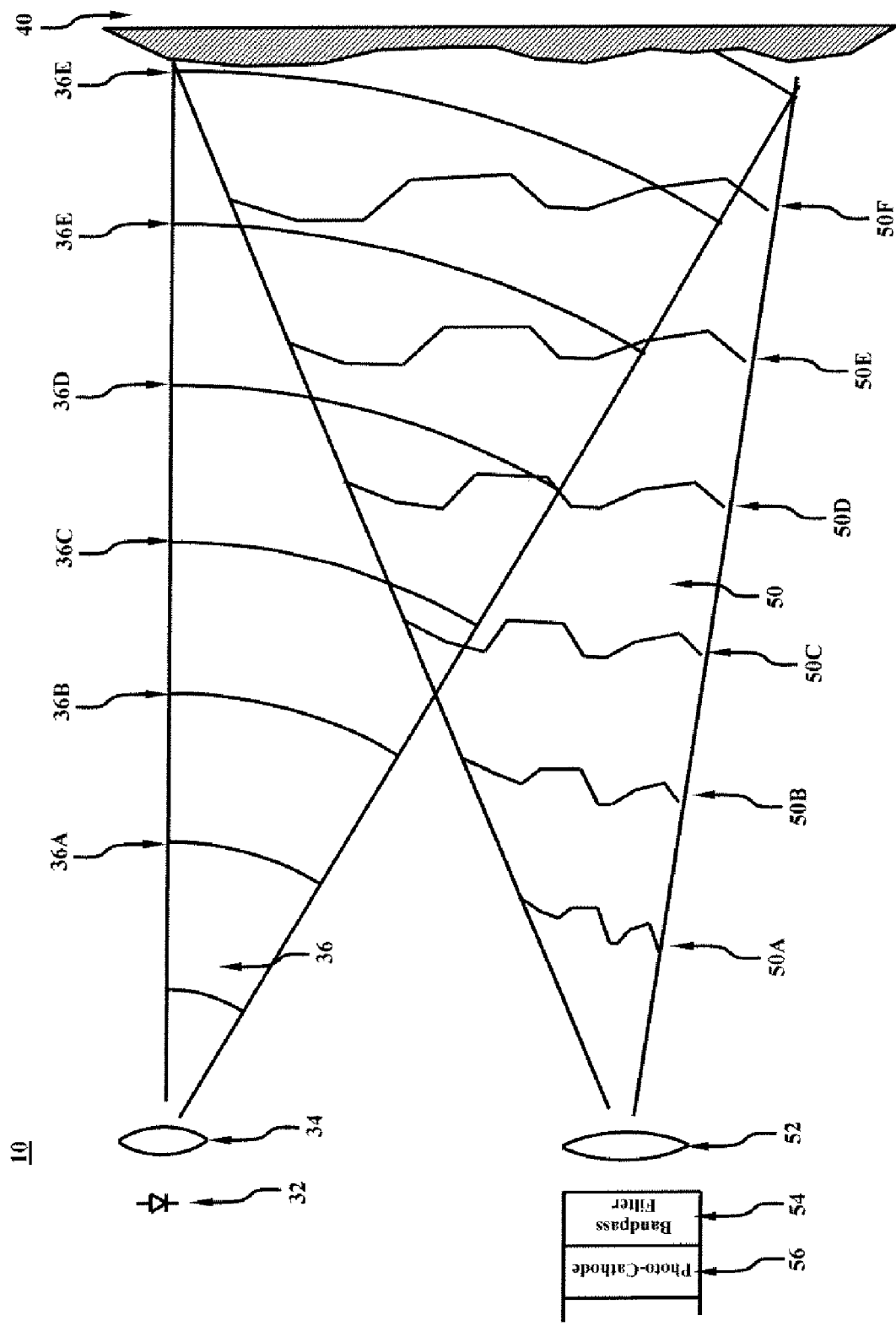
FIG. 3 is a cross-sectional view of an electromagnetic emission and an emission with equiphase lines of the coherent burst waveform before and after the waveform reaches the target scene.

Referring to FIG. 3, the illumination of the target scene 40 by the emission 36, as well as some of the equiphase wavefronts 36A through 36F of the modulated electromagnetic emission 36 is illustrated. An equiphase wavefront of the electromagnetic emission 36 is a substantially spherical surface, centered about an emission point. A defining characteristic of the equiphase wavefront is that the phase of the sinusoidal modulation of the emission 36 is the same for all locations of the surface. If, for example, the frequency of the sinusoidal modulation of the emission 36 is 100 MHz, then its wavelength is 3 meters, and all spherical surfaces $3n$ meters apart have the same phase, when n is an integer.

Additionally, FIG. 3 illustrates how the wavefronts appear to the image capture assembly 55 after the emission 36 is reflected from the target scene 40. These wavefronts 50A through 50F are still equiphase in nature, and continue to be spaced apart in accordance with the modulation frequency. Assuming a non-plano target scene 40, these wavefronts 50A through 50F no longer lie on a spherical surface and have the shape of the target scene 40 impressed upon them. Furthermore, because the wavefronts 36A through 36F and wavefronts 50A through 50F both pass through the distance variations of the target scene 40, the wavefront variations of the back-reflected wavefronts 50A through 50F vary in accordance with a factor of two times the distance variations of the target scene 40.

The target scene 40 can be any object or body of interest whose three-dimensional shape and reflectance, as a function of position and, optionally, color, is to be captured. The preferred target scene 40 is one that is diffusely reflective and does not have light-trapping characteristics, although the present invention will work with poorly reflecting target scenes. With a suitable target scene 40, light or electromagnetic emission 36 emitted by the laser diode 34 that illuminates the target scene 40 will be substantially reflected back to the three-dimensional imaging system 10. A portion of this back-reflected light or electromagnetic emission 50 will then be collected by a lens in focusing system 52. The purpose of this lens in focusing system 52 is to collect as much of the back-reflected light or electromagnetic emission 50 as possible, such that the amount of electromagnetic emission is maximized for down-stream detection. The lens in focusing system 52 also serves to image the electromagnetic emission 50 reflected from the target scene 40 through the bandpass filter 54 onto the photocathode device 56. The modulation waveform of the electromagnetic emission 50 is substantially the same as the waveform created by the burst waveform generator 22 temporally, except that it is delayed in time.

The lens in focusing system 52 has a variable focal length to allow the operator to zoom in on a portion of a target scene 40 or to accommodate variations in size of the target scene 40, although other arrangements can be used, such as having a fixed focal length. As mentioned earlier, the viewing area of the target scene 40 imaged by the lens in focusing system 52 can be adjusted in cooperation with the lens in focusing system 34 such that the area of the target scene 40 illuminated by the emission 36 matches the area of the target scene 40 imaged by the lens in focusing system 52.

Before the electromagnetic emission 50 reflected from the target scene 40 reaches the photocathode device 56, it first passes through the bandpass filter 54. This bandpass filter 54 allows the electromagnetic emission 50 to pass through largely unattenuated, but substantially blocks or attenuates all other electromagnetic emission that the photocathode device 56 can detect. As a result, only the electromagnetic emission generated by the laser diode 32 and reflected by the target scene 40 is allowed to reach the photocathode device 56. This increases the signal-to-noise ratio of the electromagnetic signal incident on the photocathode device 56. A small amount of electromagnetic signal not generated by the laser diode 32 will also reach the photocathode device 56 through the bandpass filter 54, but this can be minimized by designing the bandpass filter 54 to have a minimal bandpass width.

The photocathode device 56 is a screen onto which the lens in focusing system 52 images a two-dimensional representation of the target scene 40. The image on the photocathode device 56 is made up of the electromagnetic emission 50 back-reflected from the target scene 40. The electromagnetic emission 50 impinging on the photocathode device 56 still retains the temporal coherent burst waveform. While each discrete location of the image on the photocathode device 56 retains the coherent burst waveform, the phase of the coherent burst waveform will vary in accordance with the distance the imaged portion of the target scene 40 is from the three-dimensional imaging system 10. Accordingly, the further away from the three-dimensional imaging system 10 a part of the target scene 40 is, the longer the length of time it takes for the electromagnetic signals 36 and 50 to reach the target scene 40 and propagate back to the photocathode device 56. This varying propagation time that varies proportionately with distance results in a varying phase delay of the coherent burst waveform at the photocathode device 56. As a result, the phase also varies in accordance with the distance of the target scene 40 features, and it is the phase delay of the received coherent burst waveform that is measured on a pixel-by-pixel basis. In this way the distance to the target scene 40 on a pixel-by-pixel basis is known and the ability to generate a third axis of imagery is created.

The photocathode device 56 converts the photons incident upon it into electrons. The number of electrons created is proportional to the number of incident photons for each image point on the photocathode device 56. The electrons created by the photocathode device 56 exit the photocathode device 56 surface at which they were generated on a side opposite from the incident photons. As a result, the generated electrons form a three-dimensional electron cloud as they leave the photocathode device 56 and retain the temporal coherent burst waveform and both the time and spatial intensity variations. Nonetheless, the number of electrons leaving the photocathode device 56 is relatively small, and significant electron amplification is required.

In order to amplify the number of electrons leaving the photocatode 56, a micro-channel plate device 58 is utilized. The micro-channel plate device 58 comprises two planar conductors separated by an insulator a few millimeters thick, through which is a multitude of through-holes through which the electrons travel, although other types of micro-channel plates with other numbers and types of layers could be used. Typically, a voltage difference on the order of several hundred volts is placed on the conductors, in order to accelerate the electrons through the holes. This voltage is produced by the high voltage power supply 64. As the electrons enter the micro-channel plate device 58, they are not only accelerated, but also strike the side of the holes knocking additional electrons loose that contribute to the current flow through the micro-channel plate device 58. After several such collisions, the current flow through the micro-channel plate device 58 can increase by several orders of magnitude, thereby effecting an electron gain mechanism. One feature of the micro-channel plate device 58 is its ability to rapidly control the gain of the electron amplification, in accordance with the applied high voltage form the high voltage power supply 64. Accordingly, the amplification factor or gain of the electronic signal can be made to vary quite fast to the point that the gain of the micro-channel plate device 58 can be varied from its minimum to its maximum in just a few nanoseconds or less. This ability of the micro-channel plate device 58 to quickly switch its gain is important in its ability to effect a sampling mechanism, or an equivalent time sampling mechanism, for temporally sampling the received coherent burst waveform, as discussed further below.

When the micro-channel plate device 58 is in the switched on state by the application of a high voltage by the high voltage power supply 64, electrons will pass though the micro-channel plate device 58 and reach the fluorescent screen 60. The fluorescent screen 60 comprises phosphor materials that cause it to glow in brightness proportionate to the number of electrons incident upon it. The spatial image of the target scene 40 is still present in the spatial characteristics of the electrons leaving the micro-channel plate device 58 and the photons leaving the fluorescent screen 60, assuming that the high voltage power supply 64 is supplying several hundred volts to the micro-channel plate device 58 over several cycles of the received coherent burst waveform. However, the voltage supplied by the high voltage power supply 64 is not on for several cycles of the coherent burst waveform, but under the control of the clock circuitry 28 is only on for a small fraction of a cycle of the coherent burst waveform. In this way, the micro-channel plate device 58 acts as a switch that allows electrons to pass through it for only a fraction of a cycle of the coherent burst waveform. After these sampled electrons pass through the micro-channel plate device 58 and reach the fluorescent screen 60, the fluorescent screen 60 will emit photons for some time and thereby affects a "hold" mechanism, in which the sampled electron signal is held and stored.

The photons emitted by the fluorescent screen 60 are then incident upon a conventional two-dimensional photo-detector array 62 which converts the photons back into electrons. These electrons can be stored on a pixel-by-pixel basis within the two-dimensional detector array 62 on pixel capacitors or other storage devices and in effect an electronic "hold" function is created. The electronic charge stored on the capacitors is capable of being held for a much longer period of time than the optical hold mechanism of the fluorescent screen 60 discussed previously. More specifically, the electronic charge held on the capacitors of the two-dimensional detector array 62 can be held for tens of milliseconds or longer until they can be read out, whereas the half-life of the fluorescent decay of the fluorescent screen 60 is only on the order of tens of microseconds. The capacitors of the two-dimensional detector array 62 also store a temporal sampling of the spatially-varying received coherent burst emission.

After the two-dimensional detector array 62 has captured an image of the sampled received coherent burst signal, i.e., its pixel capacitors each have stored upon them as much electronic charge available to them after the photons from the fluorescent screen 60 have been converted into the electrons, the two-dimensional detector array 62 can be read out. This is accomplished by one or more signal lines 61 over which the pixel capacitors are connected in a multiplexed fashion to the amplifier system 66 The electronic signal carried by one or more of the signal lines 61 are directed to one or more amplifiers in amplifier system 66, e.g. one amplifier per signal line 61, for amplification. Typically several signal lines 61 are employed, in a parallel arrangement, to facilitate the rapid transfer of the sampled image out of the two-dimensional detector array 62. For ease of illustration, only one of the signal lines 61 is shown coupled to the amplifier system 66, however all of the signal lines 61 are coupled to the amplifier system 66 in this embodiment.

Next, the electronic signals amplified by the one or more amplifiers in amplifier system 66 are passed to the AGC system 68. The AGC system 68 further amplifies or even attenuates the electronic signal to a level suitable for subsequent A/D conversion by A/D converter 70 and DFT processing by digital processing system 20. For example, if the received coherent burst emission is too bright, in which case the downstream A/D converter 70 might saturate, then the digital processing system 20 can compute the brightness of a pixel, i.e., the amplitude of the temporally sampled signal, by way of equation (3) below. Based on the computed amplitude, the digital processing system 20 will issue a command, by way of the AGC driver 72, to reduce or increase the gain of the AGC system 68. On the other hand if the target scene 40 is some distance from the three-dimensional imaging system 10, then the received coherent burst signal may be weak and the resulting signal at the A/D converter 70 will be too small. In this case the AGC system 68 will be commanded to amplify the weak signal input to it by the digital processing system 20 via the AGC driver 72. Typically, the AGC gain is held at a constant value for all the pixels and all the captured or sampled images needed to generate the three-dimensional image.

An exception to this is when the AGC system 68 can be varied to account for and remove any non-uniformities in the illumination of the target scene 40 by the laser diode 32 and lens in focusing system 34. Often a target scene 40 that is illuminated by a small source through a lens will have more illumination at the center and less at the edges of the target scene 40. This can be objectionable and, if the characteristics of the illumination roll-off are known a priori, can be removed. Specifically, the AGC driver 72 and AGC system 68 can be controlled to have more gain with respect to pixels at the edge of the target scene 40 and less gain with respect to pixels near the center of the target scene 40.

An alternate method of performing this AGC function is by way of controlling the magnitude of the high voltage provided by the high voltage power supply 64. The electron gain of the micro-channel plate device 58 is a function of the applied high-voltage. Simply providing a high voltage supply driver (not shown) under the control of the digital processing system 20 and coupled to the high voltage power supply 64 would allow for the control of the electron gain of the micro-channel plate device 58. This control can be exercised by the high voltage supply driver by controlling the magnitude of the high voltage, the width of the high voltage pulses applied to the micro-channel plate device 58 or both.

Next, the A/D converter 70 receives the gain-adjusted signal from the AGC system 68, and converts the analog signal into a digital format. This conversion occurs for each pixel of the two-dimensional detector array 62, although other numbers of the pixels, such as a subset, could be converted. Since the A/D conversion can be a slow process, several A/D converters can be assembled so that they operate in a parallel configuration to reduce the time of the overall image analog to digital conversion process. Each pixel of the two-dimensional detector array 62 is read out, amplified by an amplifier system 66, gain adjusted by an AGC system 68, and converted into a digital format by an analog-to-digital converter 70, whose digital representation is then input to the digital processing system 20 for further processing.

In this embodiment, a frame of the image data captured by the two-dimensional detector array 62 is read out, converted to a digital format by the A/D converter 70, and input to the digital processing system 20 on a frame by frame basis, although other types and numbers of operations for processing the image data in other manners could be performed. Each frame is stored in memory by the digital processing system 20 for subsequent processing. The digital processing system 20 utilizes a discrete Fourier transform (DFT) to extract the phase information of the received modulated image, on a pixel-by-pixel basis. If the DFT is a four point DFT, then four image frames, each collected 360°/4=90° apart in equivalent time or even in non-equivalent time, will be needed for the DFT. By way of example, the four-point DFT formula for computing the image phase at a particular pixel used by the digital processing system 20 is $$\phi = \tan^{-1}[(x_1 - x_3)/(x_0 - x_2)]. \quad (1)$$

where $\phi$ is the phase of the received sinusoid at the pixel, and $x_0$ through $x_3$ are the four samples collected 90° apart along the modulation sinusoid, at the particular pixel. From the phase, the digital processing system 20 determines the distance to the target scene object corresponding to that pixel is:

$$D = \lambda(\Delta\Phi)/(4\pi) \quad (2)$$

where D is the distance, λ is the wavelength of the modulation frequency (e.g., is 30 meters if the modulation frequency is 10 MHz), and ΔΦ is the difference in phase of the received signal according to equation (1) relative to the transmitted phase. Generally the transmitted phase is taken to have a value of 0°, in which case ΔΦ=φ. The amplitude of the received signal at each pixel, corresponding to the reflectance of the target scene at that pixel location, is also needed. For a four-point DFT the digital processing system 20 determines the amplitude is:

$$A = \mathrm{sqrt}[(x_1 - x_3)/(x_0 - x_2)] \tag{3}$$

where A is the amplitude of the received sinusoid at the pixel, and $x_0$ through $x_3$ are the four samples collected 90° apart at the particular pixel, and sqrt is the square toot function. In these embodiments, the phase, distance, and amplitude computation by the digital processing system 20 occurs for every pixel of the image, although in other embodiments other subsets of pixels could be used.

Figure 4:
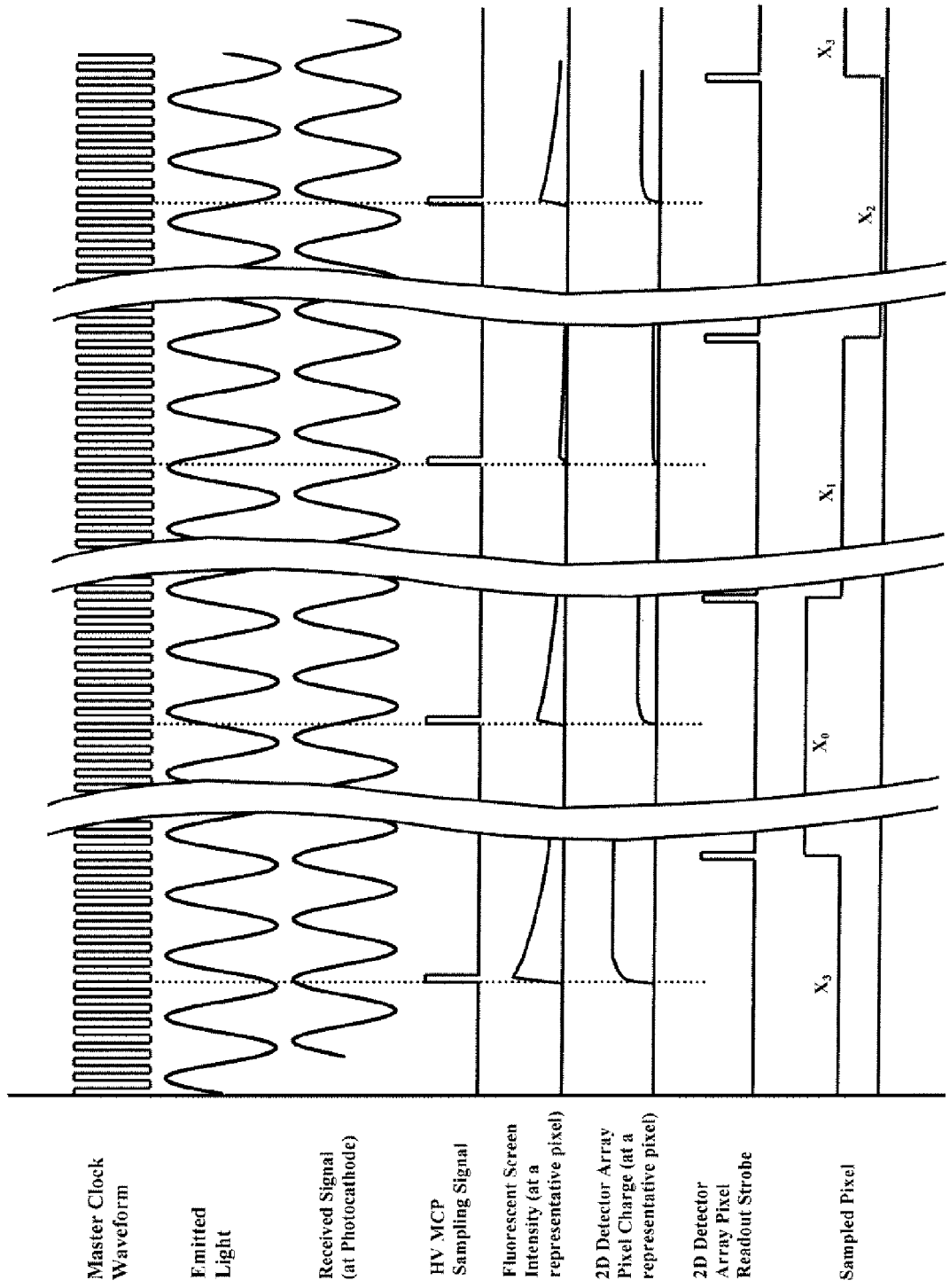
FIG. 4 is a timing diagram illustrating the relationships between various signals of the three-dimensional imaging system in accordance with embodiments of the present invention.

Referring to FIG. 4, the timing diagram illustrates the relationship of the signals occurring within embodiments of the present invention. The timing is driven firstly by the Master Clock Waveform, which is a binary signal, whose frequency is determined by the crystal oscillator 26 of FIG. 1. If a four-point DFT is used for the phase computation, it will be useful if the frequency of the Master Clock Waveform is four times greater than the burst modulation frequency to facilitate the collection of the image samples that are 90° apart along the modulation sinusoid (but 360° along the Master Clock Waveform).

Next, the binary Master Clock Waveform is divided down by the number of points of the DFT (e.g., four), and then is gated and low-pass filtered so it becomes the sinusoidally modulated burst waveform. This waveform is applied to the laser device 32 as described previously, resulting in the Emitted Light waveform of FIG. 4. This electromagnetic emission, shown as 36 in FIG. 3, then reflects off the target scene 40 of FIG. 1, and when the reflected electromagnetic emission 50 is collected and reaches the photocathode device 56 it has the same temporal waveform as the Emitted Light waveform, but is delayed in time as depicted by the Received Signal waveform. It is this delay in time, according to the phase shift between the Emitted and Received waveforms that is computed with the DFT as described above and is proportional to the distance to the target scene 40 at that pixel location.

The next waveform in FIG. 4 is the High Voltage Micro-Channel Plate Sampling Signal that is used to perform the sampling of the Received Signal waveform. The high voltage pulse is synchronized to the Master Clock Waveform, and is asserted once every N cycles of the Master Clock Waveform, where N is an integer including the value of one. Since N cannot be less than one, the sampling rate is less than twice the frequency of the waveform being sampled. This sampling technique also is known as sub-Nyquist sampling or equivalent time sampling. When the high voltage pulse is asserted, the micro-channel plate device 58 simultaneously samples a signal for every pixel comprising the target scene 40. The phase of the Received Signal waveform being sampled will vary across the micro-channel plate device 58 in accordance with the distance to the features of the target scene 40 imaged onto the micro-channel plate device 58.

During the sampling process, when the High Voltage Micro-Channel Plate Sampling Signal is asserted, the electrons created by the photocathode device 56 are intensified by the micro-channel plate device 58 and impinge upon the fluorescent screen 60 of FIG. 1. The fluorescent screen 60 fluoresces in an amount proportionate to the number of electrons striking it from the micro-channel plate device 58 on a pixel by pixel basis. The fluorescence waveform at an arbitrary pixel is shown as the Fluorescent Screen Intensity waveform in FIG. 4. The amplitude of the first exponential-like pulse of the Fluorescent Screen Intensity waveform is different than the next, in correspondence to the value of the Received Signal waveform at the photocathode 56 at the time that the high voltage signal is asserted by high voltage power supply 64. If a four point DFT is used, typically there will be four discrete amplitudes of the pulse-like waveforms at the fluorescent screen 60 for each pixel.

The Fluorescent Screen Intensity waveform is an optical signal, which is nominally directed to the two-dimensional detector array 62 of FIG. 1 as described earlier. At the two-dimensional detector array 62, each detecting element, or pixel, will collect the photons of the Fluorescent Screen Intensity waveform, and convert the photons into electrons. The electronic charges are then stored, typically on a small capacitor internal to the pixels of the two-dimensional detector array 62. The charges are stored in a fashion so the value of the charge is proportional to the number of photons incident on the pixel of the two-dimensional detector array 62. Accordingly, each pixel of the two-dimensional detector array 62 integrates the photon flux incident upon it from the fluorescent screen 60, converts the photon flux to electrons, and stores the electronic charge on an internal capacitor to result in the Two-Dimensional Detector Array Pixel Charge waveform. The units of the Two-Dimensional Detector Array Pixel Charge waveform are either voltage, or Coulombs.

After an image frame has been captured, the pixels are then read out. A read-out strobe signal, shown as the Two-Dimensional Detector Array Pixel Readout Strobe waveform of FIG. 4, is used to cause the contents of the charge on the internal pixel capacitors to be output from the Two-Dimensional Detector Array 62. If the DFT processing is a four-point DFT, then four such sampling cycles will be needed (each 90° apart in time or equivalent time), and if the four sampled values are shown sequentially, then the Sampled Pixel waveform, shown at the bottom of FIG. 4, will result. The voltage levels of the Sampled Pixel waveform have been labeled as $x_0$ through $x_3$ and these are the four sample values input to equation (1) above for processing by the digital processing system 20.

Figure 5:
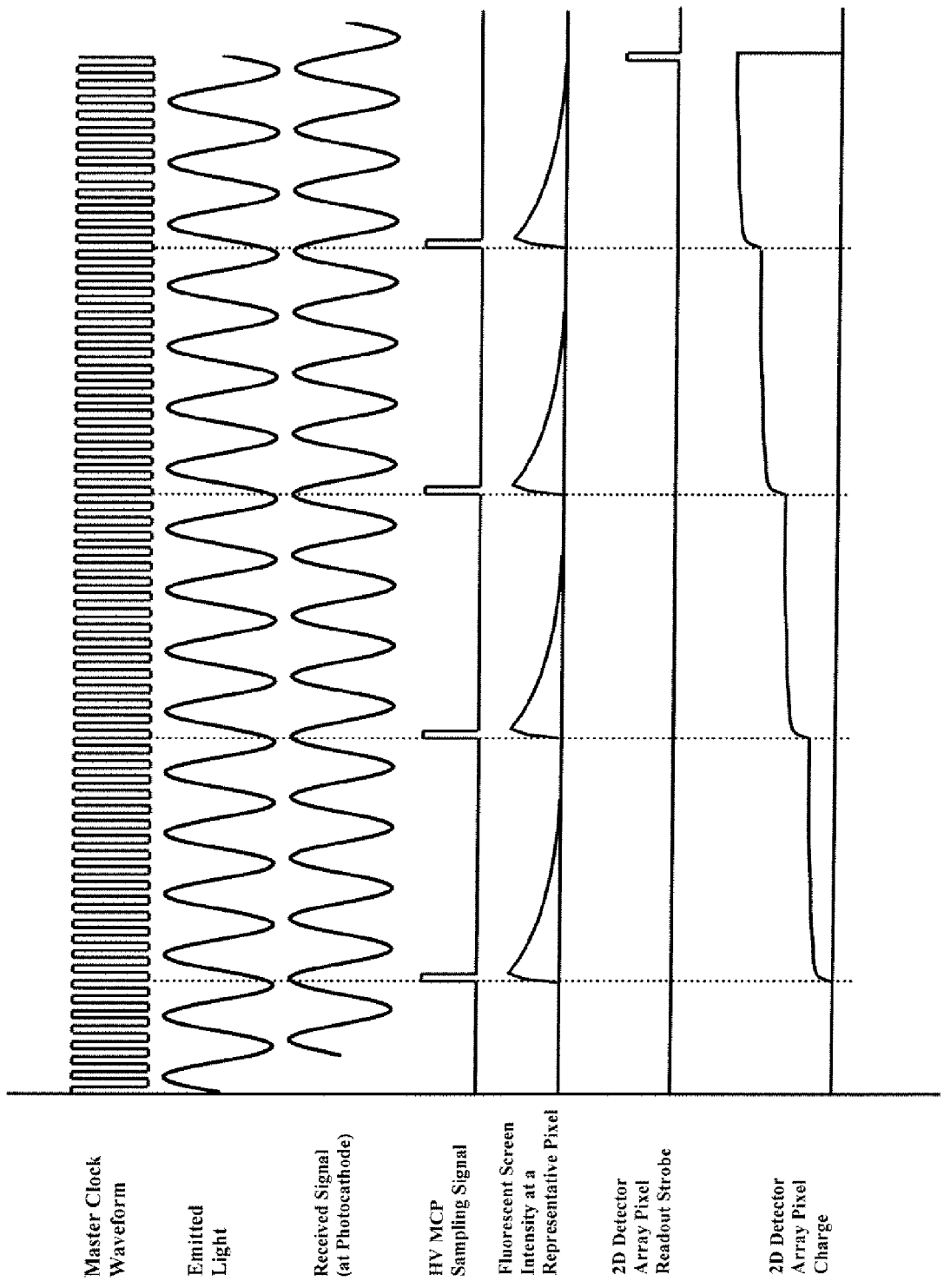
FIG. 5 is an alternate timing diagram illustrating the relationships between various signals of the three-dimensional imaging system with enhanced sampling and signal collection in accordance with other embodiments of the present invention.

A variation on this internal timing is shown in FIG. 5. In the timing diagram shown in FIG. 4, one Received Signal sample was collected for each point of the DFT. However, for each DFT sample point it is beneficial to collect and add together multiple samples of the Received Signal waveform so ultimately the signal-to-noise ratio of the Sampled Pixel waveform is improved. To be meaningful, these multiple Received Signal samples should be collected at the same equivalent point on the Received Signal waveform. In other words, the sample must occur N360° (where N is an integer) along the Received Signal waveform, which can be accomplished by sampling every 4×N×360° of the Master Clock Waveform. If this were to happen then several nearly identical exponential-like pulses would occur at the fluorescent screen 60 for each pixel, for each DFT point, as illustrated by the Fluorescent Screen Intensity waveform of FIG. 5.

As described in connection with FIG. 4, the photons comprising the Fluorescent Screen Intensity waveform are directed to the two-dimensional detector array 62 of FIG. 1. Now however, the read-out pulse, shown as the Two-Dimensional Detector Array Pixel Readout Strobe of FIG. 5, occurs after several "sub-samples" have been taken. For each sub-sample, the amplitude of the Two-Dimensional Detector Array Pixel Charge waveform increases in an additive process, thereby increasing the magnitude of the sampled pixel signal. At the same time, the accumulation of charge over multiple sub-samples also performs an averaging function in which noise-induced variations of the Fluorescent Screen Intensity pulses are reduced. The reduction of noise in this manner further improves the signal-to-noise ratio. After four sub-samples are collected as shown in FIG. 5, although other numbers of sub-samples could be collected, the Two-Dimensional Detector Array Readout Strobe signal is asserted and the two-dimensional detector array 62 is read out as described herein.

The operation of the imaging system 100 in accordance with other embodiments of the present invention is the same as the operation of the imaging system 10 except as described and illustrated herein. The imaging system 100 operates on three different colors of emitted and received light, e.g. red, green, and blue in this example, although other color imaging combinations can be used. In this embodiment, the coherent burst waveforms illustrated in FIGS. 2A and 2B are modulated onto the carriers of the three different laser diodes 134, 135, and 136. Electromagnetic emission 137 represents the red, green, and blue color emissions from the different laser diodes 134, 135, and 136 directed through respective lenses in focusing systems (not shown in FIG. 6) onto the target scene 40 for capturing a color, three-dimensional image.

The reflected electromagnetic emission 150 represents the reflected emissions from the transmissions from the red, green, and blue laser diodes 134, 135, and 136. A lens in each of three focusing systems 152 are positioned in correspondence with the red, green, and blue photocathode devices 156 for each color or wavelength emitted by the laser diodes 134, 135, and 136. The lens in each of three focusing systems 152 focus the reflected electromagnetic emission onto red, green, and blue passband filters 154, respectively, each of which have a passband that matches the emission spectrum of the corresponding laser diode 134, 135, and 136. The photons which pass through the red, green, and blue passband filters 154 are directed onto the corresponding red, green, and blue photocathode devices 156.

The electrons generated by the three photocathodes are passed through three different micro-channel plates 158. Each of the red, green, and blue micro-channel plate devices 158 is supplied with a pulsing high voltage signal from one of the three high voltage power supplies represented by reference number 164, as shown in FIGS. 4 and 5, which when high allows for the gain of the red, green, and blue micro-channel plate devices 158 to substantially amplify the electronic signal as described above. Under the control of the clock circuitry 128, this switching gain function allows for the sampling of the received coherent burst signal. As before, the sampling rate can be less than twice the frequency of the burst modulation. This technique also is known as equivalent time sampling or sub-Nyquist sampling.

When a sampled electron signal passes through one or more of the red, green, and blue micro-channel plate devices 158, the electrons then impinge on their respective red, green, and blue fluorescent screens 160. The red, green, and blue fluorescent screens 160 convert the electrons back into photons in the same manner as described earlier. The photons from the red, green, and blue fluorescent screens 160 respectively impinge onto the light sensitive faces of the red, green, and blue two-dimensional detector arrays 162. The red, green, and blue two-dimensional detector arrays 162 each convert the incident photons back into electrons which are then stored in an internal capacitor or other storage device. The accumulation and averaging methods illustrated and described earlier with reference to FIG. 5 can also be used with the imaging system 100.

Each of the red, green, and blue two-dimensional detector arrays 162 are coupled to one set of signal processing components comprising the amplifier system 166, the AGC system 168, the A/D converter 170, and the AGC driver 172, although the set can comprise other numbers and types of components in other configurations. Again since the components and their connections and operation for each of these sets are the same, only one set from the red two-dimensional imaging array 162 is illustrated and described herein. The set (not shown) coupled between the digital processing system 20 and the green two-dimensional imaging array 162 and the set (not shown) coupled between the digital processing system 20 and the blue two-dimensional imaging array 162 are identical in structure and operation and thus will not be illustrated and described here. All of these sets operate the same as the set described above for the monochromatic three-dimensional imaging system 10 and thus will not be described again here.

The outputs from the three A/D converters (again for ease of illustration only the A/D converter 170 for the set for the red two-dimensional imaging array 162 is shown) are directed to the digital processing system 120, which samples and computes the amplitude and phase of the signal at every pixel of each of the red, green, and blue two-dimensional detector arrays 162. The phase information is converted to distance by the digital processing system 120 using equation (2), although other manners for determining phase could be used. The three resulting red, green, and blue three-dimensional images comprising amplitude and distance information are then fused into a single polychromatic three-dimensional image by the digital processing system 120. The resulting polychromatic three-dimensional image is then output by the digital processing system 120 to display system 176, although the resulting polychromatic three-dimensional image could be provided to other locations, such as to a storage device.

One aspect of the polychromatic three-dimensional imaging system 100 is the coordination of the emissions from laser diodes 134, 135, and 136, shown collectively as 137. It is possible to have all three laser diodes 134, 135, and 136 emitting their respective modulated light simultaneously, provided that the narrow bandpass optical filters 154 are narrow enough to only allow a single color to pass through. In other word, the laser diodes 134, 135, and 136 can simultaneously emit provided that, for example, light from the red laser 134 does not enter the green or blue photocathodes 156. The ability of the laser diodes 134, 135, and 136 to simultaneously emit light decreases the image capture time, at the cost of added expense arising from the increased performance requirements of the red, green, and blue bandpass filters 154. If the increased cost for the red, green, and blue bandpass filters 154 is undesirable, then the burst waveform generator 122 can be modified so that only one laser diode 134, 135, and 136 is driven at a time, with an ultimate three-fold increase in three-dimensional color image capture time.

By way of example only, applications for the present invention include guidance and navigation systems for autonomous and semi-autonomous vehicles, as well as collision avoidance and adaptive cruise control systems for vehicular usage. The present invention also can be used for consumer photography, professional photography, as well as for cinematography. Industrial applications are manifold, including robotics, parts sorting, and inspection systems.

With respect to collision avoidance, the present invention can be utilized in an automotive embodiment in which the emission source (heretofore designated as a laser diode 32) comprises an array of LEDs that form a headlight. Since LEDs can be readily modulated with a coherent burst waveform, and headlights have sufficient optical power to illuminate objects over long target scene distances, an LED headlight makes an ideal emission source. The receiver subsystem can be installed some distance away from the headlight on the front of the vehicle, and the round trip distance to the target scene 40 would then need to account for the distance between the headlight and receiver during distance computation using triangulation methods.

With the present invention, it is not necessary that the transmission system and the receiver system are contained in the same housing. The two systems can be collocated in the same or different housings. Whenever the transmission system and the receiver system are spaced apart by a substantial fraction of the target scene distance, the baseline distance between the transmitter and receiving system should be accounted for in the distance calculations using triangulation methods.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations, such as arrows in the diagrams therefore, is not intended to limit the claimed processes to any order or direction of travel of signals or other data and/or information except as may be specified in the claims. Accordingly, the invention is limited only by the following claims and equivalents thereto.

What is claimed is:

1. A method for three-dimensional image capturing, the method comprising:
    sampling and amplifying one or more emissions which are reflected back from a target scene with one or more micro-channel plates and are used to capture a three dimensional image of the target scene, each of the one or more micro-channel plates having a plurality of through holes, the sampling and amplifying further comprises converting the one or more emissions which are reflected back from the target scene into electrons, amplifying the converted electrons with the one or more micro-channel plates, converting the amplified electrons into photons, and converting the photons into electrons with a detection array;
    processing with an image processing device the one or more sampled emissions in one or more frames, wherein within each frame a phase is extracted on a pixel-by-pixel basis, the processing the one or more sampled emissions is based on the electrons converted from the photons; and
    generating and providing with the image processing device the three dimensional image of the target scene based on the extracted phase for at least a portion of the pixels from the one or more of the frames.

2. The method as set forth in claim 1 further comprising transmitting the one or more emissions towards a three-dimensional target scene.

3. The method as set forth in claim 2 wherein the one or more emissions are electromagnetic.

4. The method as set forth in claim 3 wherein the one or more emissions comprise at least one of an infra-red, visible, ultraviolet, Terahertz-wave, millimeter wave, and radio frequency emission.

5. The method as set forth in claim 2 further comprising generating a sinusoidally modulated waveform, wherein the transmitting the one or more emissions is based on the generated sinusoidally modulated waveform.

6. The method as set forth in claim 5 wherein the sinusoidally modulated waveform is a coherent burst waveform.

7. The method as set forth in claim 2 further comprising a focusing at least a portion of the one or more emissions towards a three-dimensional target scene.

8. The method as set forth in claim 2 further comprises focusing at least a portion of the one or more emission reflected back from the target scene for the sampling.

9. The method as set forth in claim 8 wherein the focusing further comprises adjusting a focal length for at least one of the focusing at least a portion of the one or more emissions towards a three-dimensional target scene and the focusing at least a portion of the one or more emissions reflected back from the target scene.

10. The method as set forth in claim 1 further comprising adjusting the amplifying in the sampling.

11. The method as set forth in claim 1 further comprising:
    converting amplified emissions into digital signals, wherein the processing the one or more sampled emissions is based on the digital signals converted from the amplified emissions.

12. The method as set forth in claim 11 wherein the amplifying further comprises applying a greater amplification towards at least one portion of the one or more sampled emissions than at least one other portion of the one or more sampled emissions.

13. The method as set forth in claim 1 wherein the processing the one or more sampled emissions further comprises using a discrete Fourier transform.

14. The method as set forth in claim 1 wherein the processing the one or more sampled emissions further comprises:
    collecting multiple samples of the emissions for the pixels; and
    adding the collected multiple samples for the pixels together for the processing.

15. The method as set forth in claim 1 wherein a frequency of the sampling is less than twice a frequency of the one or more emissions.

16. A system for three-dimensional image capture, the system comprising:
    an imaging assembly that samples and amplifies one or more emissions which are reflected back from a target scene with one or more micro-channel plates and are used to capture a three dimensional image of the target scene, each of the one or more micro-channel plates having a plurality of through holes one or more first conversion systems that convert the one or more emissions which are reflected back from the target scene into electrons, one or more micro-channel plate systems each having a plurality of through holes that amplify the converted electrons from the one or more first conversion systems, one or more second conversion systems that convert the amplified electrons into photons, and one or more detection arrays that convert the photons directed from the one or more second conversion systems into electrons; and
    an image processing system that processes the one or more sampled emissions from the imaging assembly in one or more frames, wherein within each frame the image processing system extracts a phase on a pixel-by-pixel basis, wherein the image processing system processes the one or more sampled emissions based on the electrons converted from the photons with the one or more detection arrays;

the image processing system generates and provides a three dimensional image of the target scene based on the extracted phase for at least a portion of the pixels in the one or more of the frames.

17. The system as set forth in claim 16 further comprising an emissions system that transmits the one or more emissions towards a three-dimensional target scene.

18. The system as set forth in claim 17 wherein the one or more emissions are electromagnetic.

19. The system as set forth in claim 18 wherein the one or more emissions comprise at least one of an infra-red, visible, ultraviolet, Terahertz-wave, millimeter wave, and radio frequency emission.

20. The system as set forth in claim 17 wherein the emissions system generates a sinusoidally modulated waveform and transmits the one or more emissions based on the generated sinusoidally modulated waveform.

21. The system as set forth in claim 20 wherein the sinusoidally modulated waveform is a coherent burst waveform.

22. The system as set forth in claim 17 further comprising a focusing system that focuses at least a portion of the one or more emissions towards a three-dimensional target scene.

23. The system as set forth in claim 17 further comprising a focusing system that focuses at least a portion of the one or more emission reflected back from the target scene for the imaging assembly.

24. The system as set forth in claim 23 wherein the focusing system further comprises an adjustment system to adjust a focal length in the focusing system.

25. The system as set forth in claim 16 further comprising:
an automatic gain control system that amplifies the one or more sampled emissions; and
an analog to digital converter that converts the amplified emissions into digital signals, wherein the image processing system process the one or more sampled emissions based on the digital signals converted from the amplified emissions.

26. The system as set forth in claim 25 wherein the automatic gain control system applies a greater amplification towards at least one portion of the one or more sampled emissions than at least one other portion of the one or more sampled emissions.

27. The system as set forth in claim 16 wherein the image processing system uses a discrete Fourier transform.

28. The system as set forth in claim 16 wherein the image processing system collects multiple samples of the emissions for the pixels and adds the collected multiple samples for the pixels together to process the one or more sampled emissions from the imaging assembly.

29. The system as set forth in claim 16 wherein a frequency of the sampling by the imaging assembly is less than twice a frequency of the one or more emissions.

30. The method as set forth in claim 1 wherein within each of the one or more frames a distance to the target scene is determined on a pixel-by-pixel basis and wherein the generating and providing the three dimensional image of the target scene is further based on determined distance for at least a portion of the pixels from the one or more of the frames.

31. The method as set forth in claim 30 wherein within each of the one or more frames an amplitude is determined on a pixel-by-pixel basis and wherein the generating and providing the three dimensional image of the target scene is further based on determined amplitude for at least a portion of the pixels from the one or more of the frames.

32. The system as set forth in claim 16 wherein within each frame the image processing system further determines a distance on a pixel-by-pixel basis and the image processing system generates and provides the three dimensional image of the target scene further based on the determined distance for at least a portion of the pixels in the one or more of the frames.

33. The system as set forth in claim 32 wherein within each frame the image processing system further determines an amplitude on a pixel-by-pixel basis and the image processing system generates and provides the three dimensional image of the target scene further based on the determined amplitude for at least a portion of the pixels in the one or more of the frames.

34. The method as set forth in claim 31 further comprising transmitting a plurality of the emissions towards a three-dimensional target scene, wherein the generating and providing the three dimensional image further comprises fusing a three dimensional image from each of the emissions together to generate and provide a polychromatic three-dimensional image.

35. The system as set forth in claim 33 further comprising an emissions system that transmits a plurality of the emissions towards a three-dimensional target scene, wherein the image processing system fuses a three dimensional image from each of the emissions together to generate and provide a polychromatic three-dimensional image.

36. The method as set forth in claim 1 wherein the sampling further comprises sampling the one or more emissions which are reflected back from a target scene with at least one of the micro-channel plates comprising at least two planar conductors separated by at least one insulator.

37. The method as set forth in claim 36 wherein the sampling further comprises sampling with the at least two planar conductors of at least one of the micro-channel plates coupled to a power source.

38. The system as set forth in claim 16 wherein at least one of the one or more micro-channel plates comprises at least two planar conductors separated by at least one insulator.

39. The system as set forth in claim 38 further comprising a power source coupled to the at least two planar conductors of at least one of the micro-channel plates.

40. A system for three-dimensional image capturing, the system comprising:
a bandpass optical filter;
an optical sampling and amplifying device that samples and amplifies one or more optical emissions which are reflected back from a target scene and filtered by the bandpass optical filter, the optical sampling and amplifying device further comprising one or more first conversion systems that convert the one or more filtered emissions which are reflected back from the target scene into electrons, one or more micro-channel plate systems that amplify the converted electrons from the one or more first conversion systems, one or more second conversion systems that convert the amplified electrons into photons, and one or more detection arrays that convert the photons directed from the one or more second conversion systems into electrons; and
an image processing system that processes the one or more sampled and amplified reflected emissions in one or more frames, wherein within each frame the image processing system extracts a phase on a pixel-by-pixel basis, the image processing system generates a three dimensional image of the target scene based on the extracted phase for at least a portion of the pixels in the one or more of the frames.

* * * * *